April 15, 1952  R. W. STREHLOW ET AL  2,593,359
TABLE SCRAP ELIMINATING DEVICE
Filed Oct. 28, 1949  4 Sheets-Sheet 1

ROBERT W. STREHLOW
ALBERT M. OLSON
LAWRENCE E. KAAP
  INVENTORS

BY *George A. Evans*
  ATTORNEY

April 15, 1952   R. W. STREHLOW ET AL   2,593,359
TABLE SCRAP ELIMINATING DEVICE
Filed Oct. 28, 1949   4 Sheets—Sheet 2

ROBERT W. STREHLOW
ALBERT M. OLSON
LAWRENCE E. KAAP
   INVENTORS

BY George A. Evans
   ATTORNEY

April 15, 1952 R. W. STREHLOW ET AL 2,593,359
TABLE SCRAP ELIMINATING DEVICE
Filed Oct. 28, 1949 4 Sheets-Sheet 3

ROBERT W. STREHLOW
ALBERT M. OLSON
LAWRENCE E. KAAP
INVENTORS

BY George A. Evans
ATTORNEY

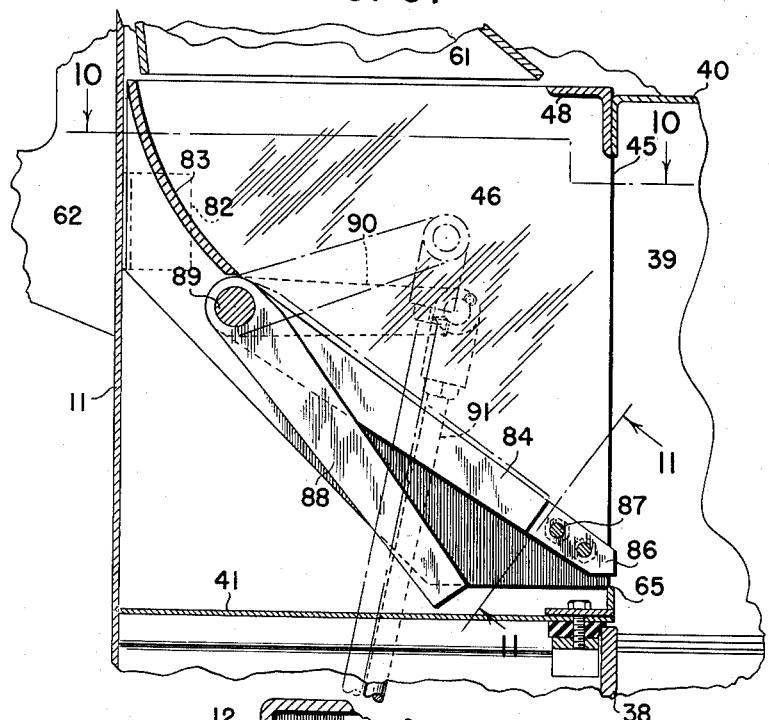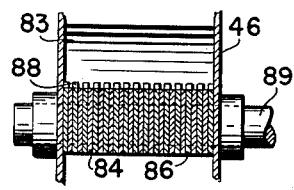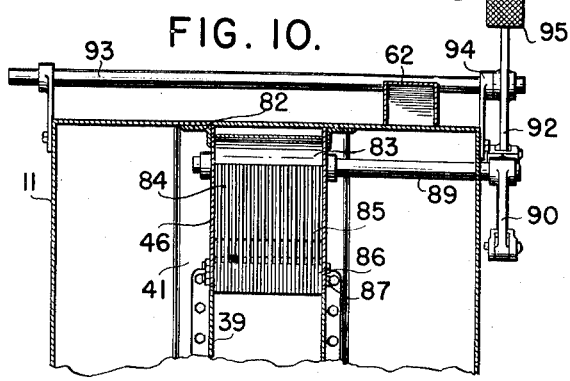

Patented Apr. 15, 1952

2,593,359

UNITED STATES PATENT OFFICE 2,593,359

TABLE SCRAP ELIMINATING DEVICE

Robert W. Strehlow, Milwaukee, Albert M. Olson, Wauwatosa, and Lawrence E. Kaap, Milwaukee, Wis., assignors to Chain Belt Company, Milwaukee, Wis., a corporation of Wisconsin Application October 28, 1949, Serial No. 124,156

18 Claims. (Cl. 241—46)

This invention relates to apparatus for providing rinsing water for dishes and disposing of table scraps which are rinsed from the dishes. The invention is primarily intended for use in kitchens as an aid to the cleansing of dishes and other tableware and provides efficient and economical means for the conservation of rinsing water and the disintegration and disposal of the refuse that is left on plates from the dining table.

The apparatus in which the invention is embodied is adapted for continuous operation, thereby making it particularly useful in the kitchens of restaurants, hotels, and the like where the quantity of dishes to be cleaned is large and rapidity of handling is essential. The invention provides means for grinding or disintegrating the aforementioned table scraps so that they may pass through the drain, and incorporates in a novel manner the grinding or disintegrating means in a single unit with the water recirculating means of the rinsing apparatus.

In order to conserve on rinsing water, there is provided a water reservoir in the lower portion of the unit in which there is submerged a pump that elevates the water through a conduit and discharges it as a column or stream such that dishes placed in its path may be effectively rinsed. The falling water is caught in a basin and is returned to the reservoir for recirculation through the pump and the conduit. In order that the water may not become too dirty, and also that its temperature may be maintained at a desirable point for rinsing purposes, fresh water at a desired temperature is constantly added to the water in the reservoir and the excess water, which is most contaminated at the surface of the reservoir, is skimmed off and passes to the drain.

Features of the rinsing apparatus just described form the subject matter of U. S. Patent No. 2,400,879 issued May 28, 1946, on an invention of F. T. Hilliker, which also incorporates means for catching silverware which might inadvertently be left on the dishes.

The present invention is directed to the association with apparatus such as is shown in the Hilliker patent, of means for separating the garbage or table scraps from the water returning to the reservoir, conveying such scraps into a grinder where it is comminuted, and utilizing the waste water from the reservoir as an aid to grinding without interfering with the recirculation of water or requiring any additional quantity of water for this purpose.

The separation of the rinsing water from the table scraps and the conveyance of the latter into the disintegrator or grinding device poses certain problems due primarily to the properties of the various materials that constitute such scraps. Some materials are difficult to convey because of their irregular shape, such as bones, while other materials, such as leaf lettuce, act as a sheath blocking water passage through the separator. Grapefruit halves are difficult to handle due to their size, as well as their shape, and the occasional presence of paper napkins poses a problem similar to that created by lettuce leaves.

The present invention preferably utilizes a separator consisting of spaced bars forming an inclined rack, the individual bars being independently movable to facilitate the movement of the refuse along the surface of the rack and to expose the spaces between the rack bars for the passage of rinsing water to the water reservoir. The scraps and rinsing water from the catch basin are discharged directly into the separator, the lower end of which feeds into a conduit communicating with the grinder.

While some of the rinsing water inevitably passes with the scraps into the grinder, wide fluctuations in the rate of diversion occur between the times when the rack is momentarily covered, as by a leaf of lettuce, and during other times. To compensate for these momentary fluctuations, the water reservoir is placed in direct communication with the feed to the grinding device, and with make-up or fresh water constantly being added to the reservoir at a predetermined rate, there is a constant flow of flushing water through the grinder at substantially the same rate, insuring efficient operation of the latter.

In one form of the invention, the individual rack bars have a pulsating movement so that some of the bars advance forward while others are retracting. This movement enables water to get between material on the rack and those bars which are retracting, and assists the forwardly moving bars in conveying the material into the grinder. Thus the space between the rack bars is kept exposed and sufficient water returns to the reservoir to enable the pump to maintain recirculation of rinsing water at a predetermined rate.

The apparatus is a unitary structure in which the elements are arranged in a single cabinet in such a compact manner that space is conserved and the various parts are readily available for service and maintenance.

Other features of the invention will become apparent from the following detailed description of the apparatus and by reference to the accompanying drawings. In the drawings:

Fig. 9 is a view similar to Fig. 5, showing a modified form of separator mechanism;

Fig. 10 is a horizontal section taken on the line 10—10 of Fig. 9, showing the modified separator in plan view; and Fig. 11 is a section taken on the line 11—11 of Fig. 9.

Figure 1:
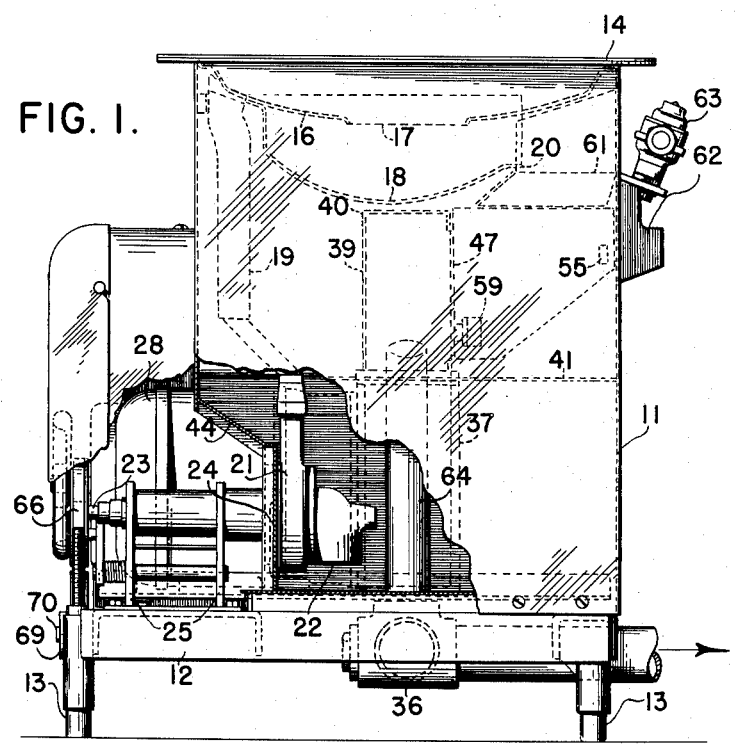
Fig. 1 is a front elevation of the combination unit with parts broken away.
Figure 2:
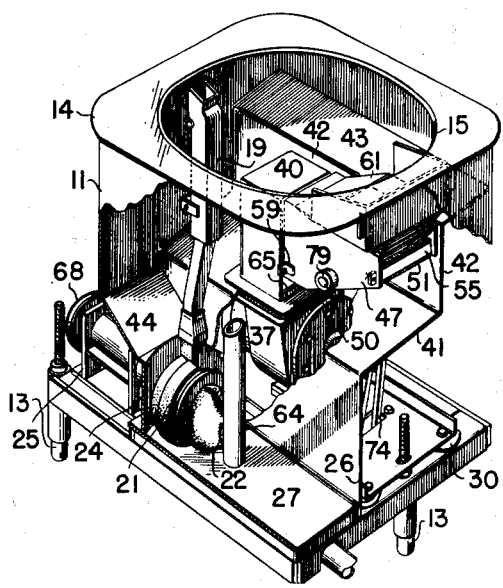
Fig. 2 is a perspective view of the apparatus shown in Fig. 1, with the scrapping and salvaging basin removed and various other parts broken away.

Referring to the drawings, and particularly the embodiment illustrated in Figs. 1 to 8 inclusive, the cabinet 11 has a base portion 12 which is supported by three adjustable legs 13. The top of the cabinet 14, which is at a convenient working height, has a large opening 15 as illustrated in Fig. 2, in which the scrapping basin 16, shown in dotted lines in Fig. 1 is arranged to fit. The basin 16 has a central aperture 17 disposed above the salvage basin 18 which is mounted on the underside of the scrapping basin.

Rinsing water, which is forced upward through the conduit 19, passes through an opening in the basin 16 which registers with the end of the conduit 19, the stream being directed in an arching fashion toward the aperture 17 in the scrapping basin. Dishes are held under this stream of water and the scraps that are rinsed therefrom are washed through the opening 17, thence through the salvage basin 18 and over the discharge lip 20 of the latter basin. Silverware is retained in the salvage basin 18 as described in the aforesaid Hilliker patent.

Water is forced through the conduit 19 by the pump 21, the inlet 22 of the pump being arranged only a short distance above the base of the cabinet. The pump 21 has an impeller shaft 23, and the pump extends through the side wall 24 of the water reservoir and is supported by the brackets 25 extending upwardly from the base 12.

The lower portion of the cabinet is divided more or less centrally by the vertical partition 26, on one side of which is the water reservoir (generally referred to as 27) in which the pump 22 is located, and on the other side of which is arranged the electric motor 28 supplying power for the pump and the other elements to be hereinafter described. The motor 28 has its base 29 resting on shock-absorbing, rubber bushings 30, through which fastening bolts 31 extend, securing it to the cabinet base 12. Directly mounted on the motor shaft 32, on one side of the motor, are a series of discs with teeth cut in their peripheries, forming the rotor 33 of the grinder, which cooperate with a perforated screen 34 to disintegrate the scraps passing therethrough, reducing them to finely comminuated form.

While the invention is not restricted to any particular type of grinding device, a highly efficient type of grinder is that described in Patent No. 2,440,051 issued April 20, 1948, to A. C. Lind et al., and reference may be had to that patent for a more detailed description of the grinder illustrated herein.

Material that passes through the screen 34 of the grinder is flushed through the rubber hose 35 into the drain header pipe 36 which is built into the base of the cabinet and may be connected in any suitable manner to the drain that leads to the sewer. The flexible connection between the header 36 and the outlet of the grinder, provided by the hose 35, absorbs vibrations from the motor as do the bushings 30 on which the motor base is mounted.

The grinder, which will hereinafter be generally designated 37, has an inlet 38 to which there is secured an upstanding stack 39, the top 40 of which is disposed directly beneath the bottom of the salvage basin 18. Material which is thrown upward by the grinder operating in its cage, may strike the top of this stack and be returned to the grinder, as described in the aforesaid Lind et al. patent. In line with the top of the inlet 38 and in sealed relation thereto, is a slightly inclined shelf 41, which may conveniently be an extension of the vertical partition 26. The higher end of the shelf 41, which is arranged above the motor 28, merges with or is extended by a vertical plate 42 arranged in back of the stack 39. A substantially horizontal plate 43 closes the space between the top of the vertical plate 42 and the back wall of the cabinet. Likewise connecting the top of the wall 24 through which the pump shaft extends, is an inclined plate 44 which lies over the pump support bracket.

From the foregoing, it will be seen that the water reservoir 27 is provided by the front and two sides of the cabinet with the side wall 24, the vertical partition 26, and the plates 41, 42, 43 and 44. Water tight joints are provided between these members although normally the water does not rise much above the level of the deck 41.

Figure 5:
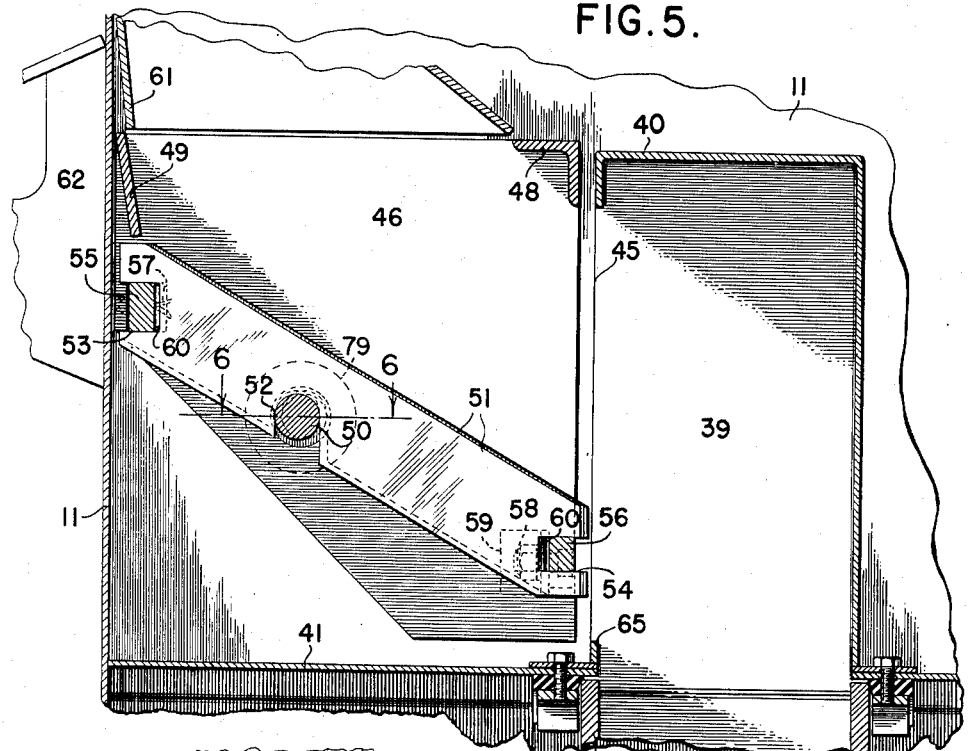
Fig. 5 is an enlarged section taken on the line 5—5 of Fig. 4.

One side of the stack 39 that leads to the grinder has a large rectangular opening 45, which is best illustrated in Fig. 5. Disposed on either side of this opening and extending closely adjacent thereto, are parallel side plates 46 of a box-like structure 47 hereinafter referred to as the separator. The side plates 46 are held together as a rigid structure by the angle iron 48 located at the front upper corner and by the cross bar 49 at the back of the separator box.

Figure 6:
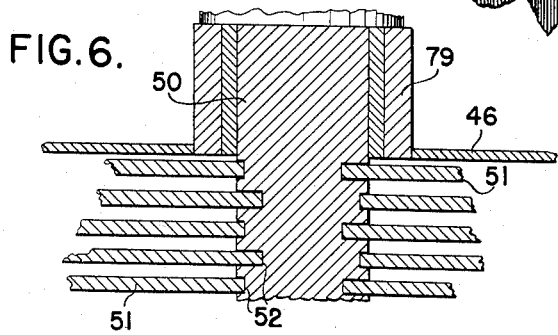
Fig. 6 is a section taken on the line 6—6 through the rack actuating shaft shown in Fig. 5.

Extending centrally of the separator and through apertures in the plates 46 is a shaft 50 which has spaced circumferential grooves, as illustrated in Fig. 6. The bottoms of these grooves form eccentric surfaces to produce oscillating movement of the rack bars 51 which are individually notched as at 52 to fit over the grooves in the shaft 50. The width of the notches 52 is such that both sides of the notches engage the eccentric grooves, whereas clearance is provided between the inner ends of the notches and the tops of the groove so as to avoid vertical movement. The top surfaces of the rack bars lie in the same general plane which inclines downwardly toward the opening in the side of the stack. The ends of each of the rack bars are notched as at 53 and 54 and movement of the bars is limited to a horizontal direction by the cross members 55 and 56, which extend between the side plates 46 of the separator, and through the respective notches 53 and 54. The spacing of the bars 51 is such, as shown, to cause the bulk of the rinse water to pass therethrough, when the bars are uncovered, and yet no space is large enough to permit passage of large table scraps.

Figure 7:
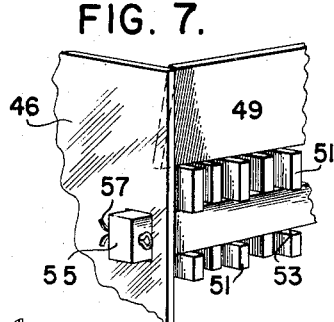
Fig. 7 is a perspective view showing the mounting of the higher ends of the rack members.
Figure 8:
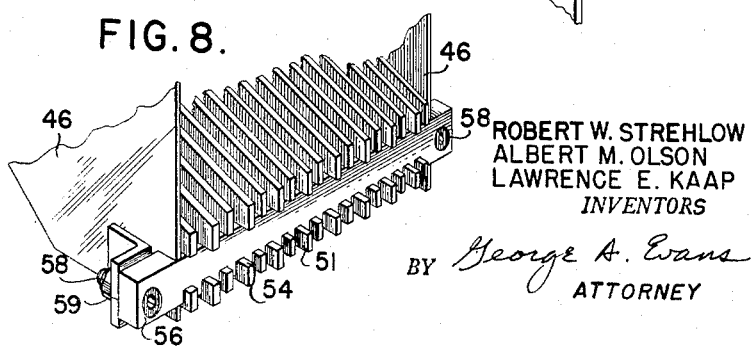
Fig. 8 is a perspective view showing the mounting of the lower ends of the rack members.

The cross member 55 engaging the notches 53 at the higher end of the separator rack extends through rectangular apertures in the side plates 46 as illustrated in Fig. 7, and cotters 57 extending through the member 55 on either side of the plates 46 prevent longitudinal movement of the member 55. The lower cross member 56 extends through notches in the front lower edge of the plates 46 and is secured by bolts 58 extending through brackets 59 mounted on the outer sides of the plates 46. The cross member 56 itself has notches on its lower edge, in which the bars 51 are guided, preventing lateral movement of the ends of the bars.

Since both members 55 and 56 have flat surfaces making sliding contact with the flat surfaces of notches 53 and 54, the only way in which the rack bars can move is in a horizontal direction, clearances 60 being provided for this purpose between the inner sides of the members 55 and 56 and the corresponding contiguous inner edges of the notches 53 and 54.

Preferably, adjacent eccentric grooves in the shaft 50 are set at a 180 degree phase with respect to each other so that as one rack bar is moving forward or to the right as shown in Fig. 5, the adjacent rack bar will be moving in the opposite direction, or to the left, in said figure. The movement of the rack bars in the manner described facilitates the downward propulsion of scrap into the grinder while the space between the rack bars enables the water to pass therethrough to the water reservoir. The forward propulsion of certain bars relative to the remaining bars also provides a space above the other bars through which water may course and produce a lifting action on materials which are resting on the bars. This lifting action facilitates the transfer of these materials into the grinding device.

Located above the separator is a hopper 61, the upper opening of which is disposed directly beneath the lip 20 of the salvage basin 18. The hopper 61 directs the rinsing water and scraps from the salvage basin directly onto the rack of the separator.

Mounted on one of the sides of the cabinet, as illustrated in Fig. 1, is a fitting 62 which supports a valve 63 to which fresh cold and hot water supply lines (each controlled by a valve, not shown) are attached and in which they are blended to the desired temperature. The fitting 62 also serves as a conduit having an external and internal opening for receiving water falling from the valve 63 and introducing such water through the side of the cabinet from whence it may fall directly into the reservoir formed at the bottom of the cabinet.

An overflow pipe 64 is connected to the drain header pipe 36, the overflow pipe 64 preferably being removable from a fitting in the base of the cabinet so as to enable complete draining of the reservoir when desired.

The lower edge 65 of the opening in the stack 39 is arranged below the top of the overflow pipe 64 and constitutes a wier which affords direct communication between water in the reservoir and the grinding device. Thus as fresh water is added through the fitting 62, an equal amount will flow over the wier 65 to aid the grinder in disposing of the scraps which are ground therein. The overflow pipe 64 serves only as an emergency overflow should the grinder become clogged and the supply of fresh water not be shut off. Should the drain from the header 36 becomes clogged, water will overflow from the cabinet through the fitting 62. It cannot back up through the fresh water lines communicating with the valve 63, because of the external opening in the fitting 62.

Naturally some small particles will pass through the rack bars into the water reservoir and the water will also become dirty through exposure to grease and other material which is left on the plates. The grease and lighter particles tend to rise in the top of the reservoir and are skimmed off by the wier 65. The size of the particles passing through the bars is controlled by the size of the openings between the bars, making due consideration to the size of particles that can pass through the pump 22. The amount of fresh water which is added, is regulated by the valve 63 so that the recirculated water does not become too contaminated for rinsing purposes. The relative quantities of hot and cold water is also controlled to maintain the recirculated water at the desired rinsing temperature.

Figure 3:
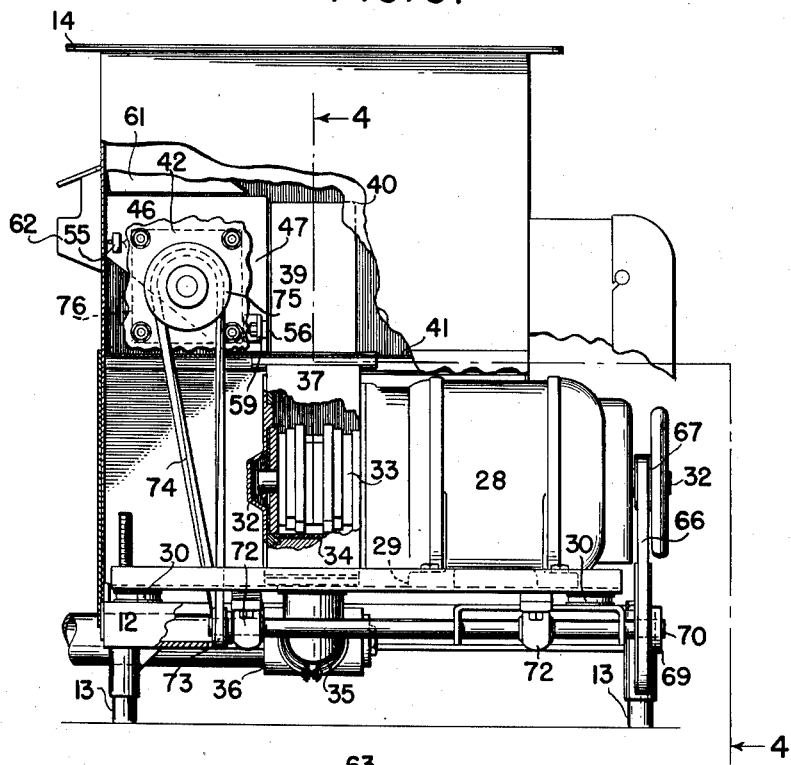
Fig. 3 is a rear elevation of the unit shown in Figs. 1 and 2, also having parts broken away.
Figure 4:
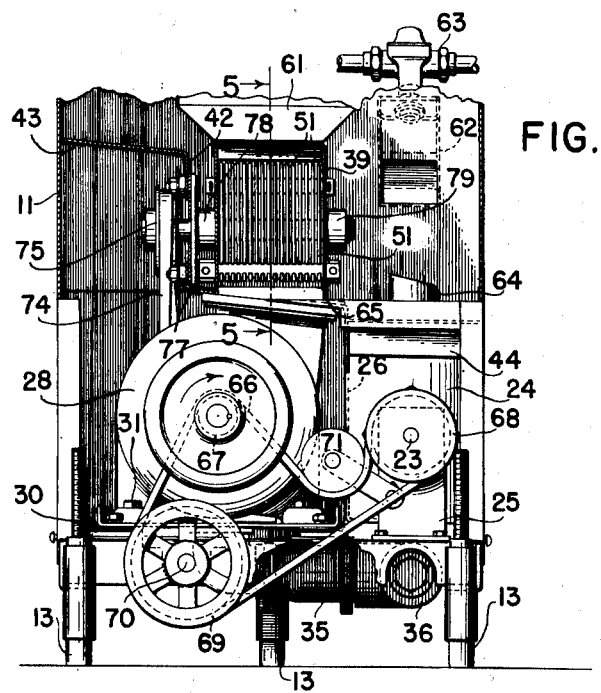
Fig. 4 is a section taken on the line 4—4 of Fig. 3.

The same motor that drives the grinder may also be used to drive the pump 21 and the shaft 50, and for this purpose the motor shaft 32 extends through the back as well as the front of the motor, as illustrated in Figs. 3 and 4. As shown in Fig. 4, a belt 66 is trained over a pulley 67 on the motor shaft and over a pulley 68 on the pump shaft 23 and over a pulley 69 on the countershaft 70. The belt 66 is tensioned by the idler pulley 71 pivotally mounted on one of the brackets 26. Countershaft 70, which is supported by bearings 72 disposed on the underside of the base 12, also carries a pulley 73 arranged substantially below the rack shaft 50 so that by twisting the belt 74, which is trained over the pulley 73, it may serve as a right angle drive for the pulley 75 which is mounted on the shaft 50. To seal the opening in the plate 42 through which the shaft 50 extends and to mount the shaft on the plate 42, a bracket 76 is bolted through a rubber gasket 77 on the plate 42. Vibrations of the rack are absorbed by deformable bushing members enclosing the studs that support the bracket 76. The bracket 76 has integral therewith the bushing 78 which serves as a bearing for the shaft 50, the end of the shaft which extends through the separator being supported by a second bushing 79 which is integral with the adjacent side plate 46 of the separator. Thus, it will be seen that the separator is entirely supported by the bracket 76 which, as previously described, is mounted on the vertical plate 42.

In operation, the reservoir 27 is first filled with water at the desired temperature for rinsing purposes. This is accomplished by adjusting the valves controlling the supply of hot and cold water and the setting of the valve 63 so as to introduce continuously the desired quantity of fresh rinsing water at the selected temperature. The electric motor is then set in operation, and the pump 21 lifts water through the conduit 19 and discharges it as a stream over the scrapping basin 16.

Water and table scraps flowing through the aperture 17 of the scrapping basin and over the lip 20 of the salvage basin are directed by the hopper 61 onto the separator 47, where the rapidly oscillating rack bars, serve as a feeder and cause the scraps to be conveyed thereon and through the opening in the side of the stack 39. Thence they fall into the disintegrator or grinder 37, are comminuted and pass out through the drain 36. Meanwhile the major portion of the rinsing water passes directly through the space between the rack bars and falls into the reservoir 27, where it commingles with the water retained therein prior to its recirculation.

Normally the amount of water pumped through the tube 19 is many times the amount of fresh water added to the reservoir. However, the quantity of flushing water required by the scrap disintegrator is approximately the same as the quantity of make-up water necessary to keep the recirculated water from being too contaminated or too chilled, and by providing a direct passage between the reservoir 27 and the disintegrator 37, by means of the wier 65, the level of water in the reservoir is maintained at a constant depth, thus providing a reservoir of suitable volume for recirculation and for mixing of fresh water introduced through the fitting 62 with the water that passes through the separator 47.

A modified form of separator is illustrated in Figs. 9 to 11 inclusive, in which the side plates 46 of the separator box are rigidly fastened by angle irons 82 secured to the side of the cabinet 11. Integral with the side plates 46 is a curved, inclined deck 83, the upper portion of which is very steeply inclined and extends to the top and back of the side plates 46. Rinse water and scraps discharged through the hopper 61, which functions the same as in the other embodiment of the invention, fall on the deck 83, and the scraps are flushed thereon by the water through the opening 45 in the stack 39 of the grinder.

The deck 83 may be made of one integral piece, or it may be made of separate members, as shown, the intermediate portion consisting of spaced bars 84 having longitudinal slots 85 therebetween. The slots 85 do not extend to the discharge end of the deck, and filler strips 86 make this end of the deck solid as is clearly shown in Fig. 10. The strips 86 are held in place by bolts 87 which extend through registered holes in the strips 86, the bars 84 and the side plates 46.

Normally, the bulk of the rinse water passes through the slots 85 and falls into the water reservoir, while the solid particles slide down the deck and hence fall into the grinder. Occasionally, however, some particle, such as a sheet of paper, a leaf of lettuce or other substance, may come to rest on the deck blocking discharge of water through the slots. To discharge this material from the deck, a set of fingers 88 are securely mounted on a shaft 89 which extends through the side plates 46 adjacent the upper end of the slots 85. The fingers 88 normally depend from the shaft 89 at a steeper angle than the slope of the deck (as shown in Fig. 9) so that the slots may be free to discharge water; but by rocking the shaft 89, the fingers may be moved through the slots to the dotted line position shown in Fig. 9, in which they extend a slight distance above the bars 84 which form the central portion of the deck. This lifts any material that might have been lodged on the bars, and such action in conjunction with the lifting action of water which may now be flowing on the bars 84 beneath the material, dislodges the scraps and moves them toward the discharge end of the deck. In Fig. 11, the relation of the raised fingers to the stationary bars is illustrated, and since the fingers occupy the entire space between the bars, it will be apparent that the rinse water must pass through the grooves formed by the sides of the raised fingers and the top of the bars. Similarly, should any material lodge on the solid discharge end of the deck over the bolts 87, raising the fingers directs all the water against such material and flushes it into the grinder.

Movement of the fingers may be effected by different mechanisms for rocking the shaft 89. This movement may occur at periodic intervals by power driven means, or may be done manually, as shown herein. In this instance, an arm 90 is secured to the end of the shaft 89 which extends beyond the side of the cabinet, and the arm 90 is connected by a rod 91 to the inner end of a lever 92 pivoted on a shaft 93 mounted adjacent the base of the cabinet by a bracket 94. A foot pedal 95 is arranged at the top of the outer end of lever 92, and by depressing this lever with his foot, the operator may lift the fingers 88 whenever desired to clear the deck of scraps that may have lodged on it.

It is recognized that still further modifications of the apparatus may be made within the spirit of the invention, and accordingly, the embodiments of the invention heretofore described, are intended to be illustrative only and the scope of the invention is to be determined solely by the following claims.

We claim:

1. In rinsing apparatus for tableware and the like having a rinsing water reservoir and a water circulating system providing a discharge of rinsing water and apparatus for collecting and returning such water to the reservoir, a scrap disposal stack, means for separating table scraps from the recirculated water and eliminating the same, said means comprising a continuously operating separator arranged to convey the table scraps from the rinsing water directly into the disposal stack while returning the separated water to the reservoir, and a disintegrator communicating with the disposal stack arranged to receive the table scraps from the separator and to reduce them to finely comminuted form.

2. In rinsing apparatus having a rinsing water reservoir and a water circulating system providing a discharge of rinsing water and apparatus for collecting and returning such water to the reservoir, means for separating table scraps from the recirculated water and eliminating the same, said means comprising an inclined deck arranged to convey the table scraps and to utilize the flushing action of the rinsing water as an aid to conveyance, while returning water to the reservoir, and a disintegrator arranged to receive the table scraps and some of the rinsing water from the deck and to reduce the scraps to finely comminuted form.

3. In rinsing apparatus for tableware and the like having a rinsing water reservoir and a water circulating system providing a discharge of rinsing water and apparatus for collecting and returning such water to the reservoir, means for separating table scraps from the recirculated water and eliminating the same, said means comprising a deck arranged to convey the table scraps while returning water to the reservoir, movable means assisting transfer of scraps along the deck and a disintegrator arranged to receive the table scraps from the deck and to reduce them to finely comminuted form.

4. Apparatus for providing rinsing water for dishes and the like and disposing of table scraps and waste material therefrom which comprises a water reservoir, a disposal stack for discharging scraps, means for withdrawing water from the reservoir and applying it to dishes to be rinsed, means for receiving the scraps rinsed from the dishes and the rinsing water used thereon, said means being arranged to separate the scraps from the water and return the separated water to the reservoir while conveying the scraps directly into the disposal stack, a scrap disintegrator communicating with the disposal stack arranged to receive and reduce the separated scraps and discharge them from the apparatus, means for adding fresh water to the reservoir to avoid excessive contamination thereof, and means for maintaining a substantially constant quantity of water in the reservoir by passing through the disposal stack and the disintegrator water from the reservoir equal in amount to the fresh water being added.

5. Apparatus for providing rinsing water for dishes and the like and disposing of table scraps and waste material therefrom which comprises a disposal stack for discharging scraps, a water reservoir, means for withdrawing water from the reservoir and applying it on dishes to be rinsed, a separator arranged to receive the scraps rinsed from the dishes and the rinsing water used thereon, said separator conveying the scraps directly into the disposal stack while returning the separated water to the reservoir, a scrap disintegrator communicating with the disposal stack arranged to receive the scraps from the separator and comminute the same as they are discharged therethrough, means for adding fresh water to the reservoir to avoid excessive contamination thereof, and means for maintaining a substantially constant quantity of water in the reservoir by passing through the disposal stack and the disintegrator water from the reservoir at a rate commensurate with the rate of fresh water introduction.

6. Apparatus for providing rinsing water for dishes and the like and disposing of table scraps and waste material therefrom which comprises a scrap disposal stack, a water reservoir, means for withdrawing water from the reservoir and applying it on dishes to be rinsed, means for receiving the scraps rinsed from the dishes and the rinsing water used thereon, said means including movable elements arranged to convey the scraps directly into the disposal stack while permitting some of the water to pass therethrough to the reservoir, a scrap disintegrator communicating with the disposal stack arranged to receive and reduce the scraps so separated, means for adding fresh water to the reservoir to maintain the rinsing water at the proper temperature, and means for maintaining a substantially constant quantity of water in the reservoir by passing through the disposal stack and the disintegrator water from the reservoir at a rate commensurate with the rate of fresh water introduction.

7. In rinsing apparatus for tableware and the like having a rinsing water reservoir, mechanism for recirculating water to and from the reservoir and applying it on the articles to be rinsed, and means for adding fresh water to the reservoir: table scrap eliminating means comprising a disposal stack, a separator arranged to receive and convey the table scraps rinsed from the tableware directly into the disposal stack while returning the separated water to the reservoir, and a disintegrator communicating with the disposal stack arranged to receive the table scraps from the separator and to reduce them to finely divided form as they are discharged therethrough, the upper portion of the reservoir communicating directly with the disposal stack above the disintegrator, whereby contaminated water from the reservoir may pass through the disintegrator as an aid to the reduction and discharge of the table scraps therein, and the level of water in the reservoir may be maintained substantially constant by the addition of fresh water as aforesaid.

8. In rinsing apparatus for tableware and the like having a rinsing water reservoir, mechanism for recirculating water to and from the reservoir and applying it on articles to be rinsed, and means for adding fresh water to the reservoir: table scrap eliminating means comprising a conveyer arranged to receive and convey the table scraps rinsed from the tableware, said conveyer having movable elements arranged to elevate the scraps to facilitate flushing action by the rinsing water, while returning water to the reservoir through apertures in the conveyer, and a disintegrator arranged to receive the table scraps from the conveyer and to reduce them to finely divided form, the upper portion of the reservoir communicating directly with the disintegrator, whereby contaminated water from the reservoir may pass through the disintegrator as an aid to the reduction of the table scraps in the grinder and their elimination therefrom, and the level of water in the reservoir may be maintained substantially constant despite momentary obstruction of the apertures in the conveyer by table scraps resting thereon.

9. In apparatus for rinsing tableware and the like having a rinsing water reservoir, mechanism for recirculating water to and from the reservoir and applying it on articles to be rinsed, and means for adding fresh water to the reservoir: table scrap eliminating means comprising a grinder for disintegrating the table scraps and flushing them to drain, a stack leading into the grinder having an aperture therein, a conveyer disposed above the reservoir arranged to receive the table scraps and rinsing water and so discharge the scraps through the aperture in the stack, said conveyer having openings through which the rinse water may pass to the reservoir, and an overflow passage between the reservoir and the stack, arranged below the discharge end of the conveyer, whereby water from the reservoir may pass through the grinder at a rate commensurate with the rate of introduction of fresh water, and the level of water in the reservoir may be maintained substantially constant.

10. Unitary apparatus for rinsing tableware and the like comprising a cabinet having an upstanding partition in its lower portion forming a water reservoir on one side thereof, grinding means disposed on the other side of the partition, water circulating means communicating with the water reservoir arranged to expel a column of water above the cabinet for rinsing purposes, a catch basin mounted in the cabinet for catching the rinsing water so expelled as well as table scraps rinsed from the tableware, a separator arranged at a higher elevation than said reservoir disposed to receive water and table scraps from the catch basin and to convey the table scraps to the grinding means while permitting rinse water to pass through the separator into the reservoir, means for adding fresh water to the reservoir causing it to overflow, means for conducting the water overflowing from the reservoir into the grinding means, and means for draining ground table scraps from the grinding means.

11. Unitary apparatus for rinsing tableware and the like comprising a cabinet having an upstanding partition in its lower portion forming a water reservoir on one side thereof, a shelf arranged above the space on the other side of the partition, grinding means disposed on the other side of the partition, water circulating means communicating with the water reservoir arranged to expel a column of water above the cabinet for rinsing purposes, a catch basin mounted in the cabinet for catching the rinsing water so expelled as well as table scraps rinsed from the tableware, a separator arranged directly above said shelf disposed to receive water and table scraps from the catch basin and to convey the table scraps to the grinding means while permitting rinse water to fall onto the shelf and hence into the reservoir, means for adding fresh water to the reservoir causing it to overflow, means for conducting the water overflowing from the reservoir into the grinding means, and means for draining ground table scraps from the grinding means.

12. Unitary apparatus for rinsing tableware and the like comprising a cabinet having an upstanding partition in its lower portion forming a water reservoir on one side thereof, a grinder disposed on the other side of the partition, a drain connected to the grinder, water circulating means communicating with the water reservoir arranged to expel a column of water above the cabinet for rinsing purposes, a catch basin mounted in the cabinet for catching the rinsing water and table scraps, a separator arranged to receive water and table scraps from the catch basin, and to convey the table scraps to the grinder while permitting rinse water to fall into the reservoir, means for adding fresh water to the reservoir, and means affording communication between the surface water in the reservoir and the grinder whereby the quantity of water passing through the grinder is maintained commensurate with the quantity of fresh water added to the reservoir.

13. Unitary apparatus for rinsing tableware and the like comprising a cabinet having an upstanding partition in its lower portion forming a water reservoir on one side thereof, a grinder disposed on the other side of the partition having an inlet duct and an outlet drain, water circulating means communicating with the water reservoir arranged to expel a column of water above the cabinet for rinsing purposes, a catch basin mounted in the cabinet for catching rinsing water and table scraps, a separator disposed to receive water and table scraps from the catch basin and arranged to convey the table scraps to the grinder while permitting rinse water to fall into the reservoir, means for adding fresh water to the reservoir, communicating means between the surface water in the reservoir and the inlet duct to the grinder, an overflow pipe providing drainage from the reservoir should the passage of water through the grinder become stopped, and a common discharge mounted on the cabinet communicating with the overflow pipe and the grinder outlet.

14. In a table scrap disposal apparatus for preliminarily rinsing tableware or the like, a housing enclosing a reservoir for rinse water, a water circulating system including a pump operatively connected to draw rinse water from said reservoir and eject it in a stream above said housing in a position to rinse tableware and return to said reservoir, a catch basin in the top of said housing disposed to receive the returning rinse water together with scraps rinsed from the tableware and having an opening through which the stream of rinse water and entrained scraps flows into the interior of said housing, screening apparatus beneath said catch basin opening arranged to screen the entrained scraps from the stream of rinse water returning to said reservoir, a scrap discharging stack arranged in said housing to receive the scraps screened from the returning rinse water and to discharge them from said apparatus, a source of water operatively connected to supply a continuous flow of fresh water to said reservoir causing it to overflow, and a skimming wier disposed in one edge of said reservoir and arranged to discharge the overflowing water and scraps floating thereon into said discharging stack, the overflowing water aiding in disposing of the scraps screened from the returning rinse water.

15. In tableware rinsing and scrap disposal apparatus, a reservoir for recirculated rinsing water, a scrap disposal stack arranged adjacent to said reservoir, a rinse water circulating system arranged to eject a stream of water drawn from said reservoir in position to rinse tableware or the like and to collect the rinse water and entrained scraps in a stream returning toward said reservoir, a continuously operating screening device arranged to intercept the returning stream of rinse water and entrained table scraps and to deflect the scraps from the stream directly into said disposal stack while the screened rinse water flows back into said reservoir for recirculation, and a scrap grinder arranged to receive the scraps deflected into said disposal stack and operative thereon to comminute them for disposal.

16. In tableware rinsing and scrap disposal apparatus, a scrap disposal stack, means to project a stream of water in position to rinse tableware or the like, means to collect the stream of rinse water and entrained scraps, a continuously operating screening system arranged to intercept the rinse water stream and to deflect the scraps from the stream directly into said disposal stack while the screened rinse water flows past said stack, a scrap grinder arranged to receive the scraps deflected into said stack and operative thereon to comminute them for disposal, and a conduit arranged to divert a portion of the rinse water into said stack above said scrap grinder to aid in the comminuting and disposal of the scraps.

17. In tableware rinsing and scrap disposal apparatus, a reservoir for recirculated rinsing water, a scrap disposal stack arranged adjacent to said reservoir, a rinse water circulating system arranged to eject a stream of water drawn from said reservoir in position to rinse tableware or the like and to collect the rinse water and entrained scraps in a stream returning toward said reservoir, a continuously operating screening device arranged to intercept the returning stream of rinse water and entrained table scraps and to deflect the scraps from the stream directly into said disposal stack while the screened rinse water flows back into said reservoir for recirculation, a scrap grinder arranged to receive the scraps deflected into said disposal stack and operative thereon to comminute them for disposal, a source of water connected to introduce additional water into said reservoir causing it to overflow, and an overflow channel arranged to conduct water overflowing from said reservoir and scraps floating thereon into said disposal stack above said scrap grinder to aid in comminuting and disposing of the scraps being discharged through said disposal stack.

18. In a table scrap disposal apparatus, a reservoir for rinse water, a circulating system including a pump operatively connected to project a stream of rinse water drawn from said reservoir upward in a manner to fall back into said reservoir, a scrap disposal stack positioned adjacent to said reservoir to receive table scraps or the like for disposal, a screening device arranged in position to screen from the returning rinse water stream table scraps that may have been rinsed from dishes or the like and to deflect the scraps into said disposal stack, an overflow channel interconnecting said reservoir with said disposal stack, and a source of water connected to introduce additional water into said reservoir to cause it to overflow through said overflow channel into said stack, whereby scrap material floating on the surface of the water in said reservoir is skimmed off into said disposal stack with the overflowing water which serves also to assist in disposing of the scraps deflected into said stack by said screening device.

ROBERT W. STREHLOW.
ALBERT M. OLSON.
LAWRENCE E. KAAP.

REFERENCES CITED

The following references are of record in the file of this patent:

UNITED STATES PATENTS

| Number | Name | Date |
| --- | --- | --- |
| 1,085,997 | Sheridan | Feb. 3, 1914 |
| 1,508,416 | Sheldon | Sept. 16, 1924 |
| 2,106,851 | Nordell | Feb. 1, 1938 |
| 2,220,729 | Powers | Nov. 5, 1940 |
| 2,391,034 | O'Brien | Dec. 18, 1945 |
| 2,400,879 | Hilliker | May 28, 1946 |
| 2,421,064 | Hilliker | May 27, 1947 |
| 2,440,051 | Lind | Apr. 20, 1948 |